(No Model.)
M. BAILEY & J. WARNER.
DEVICE FOR PREVENTING THE ESCAPE OF NOXIOUS FUMES FROM BATTERIES.
No. 363,880. Patented May 31, 1887.
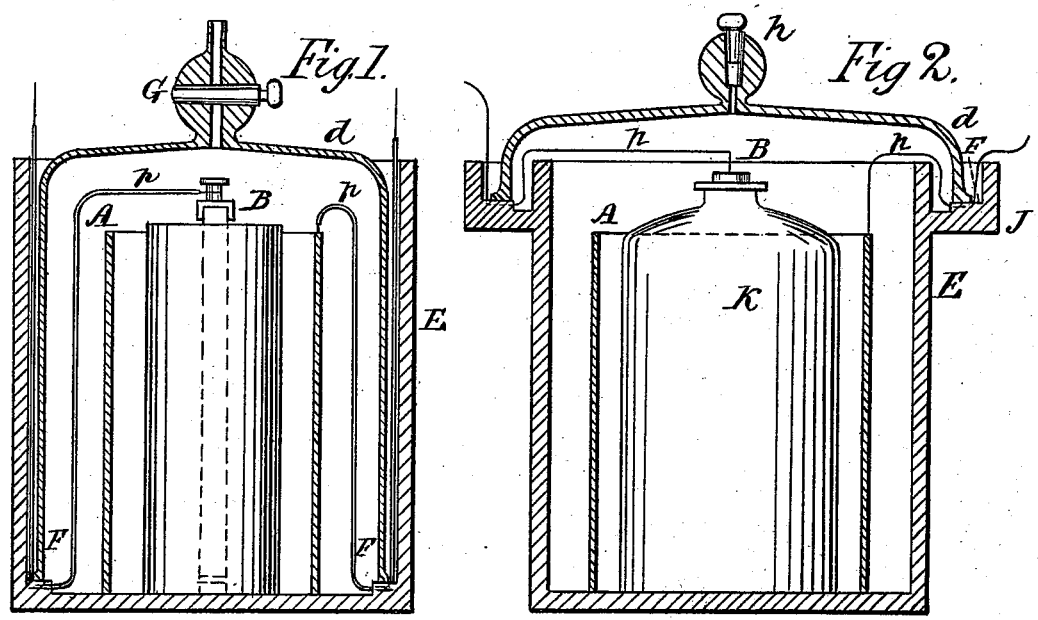
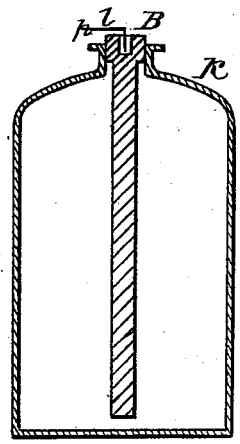
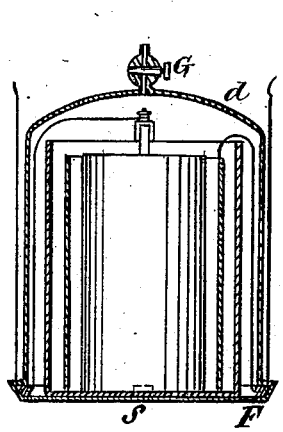
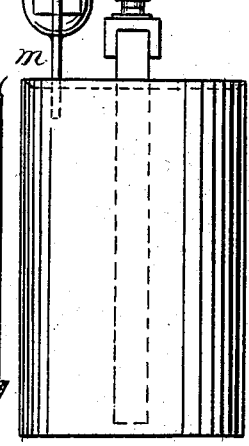
Witnesses
James Edward Currie
Conrad Henry Marks
Inventors
Mark Bailey
John Warner
per F. M. Rogers
Attorney

UNITED STATES PATENT OFFICE.

MARK BAILEY AND JOHN WARNER, OF LONDON, ENGLAND.

DEVICE FOR PREVENTING THE ESCAPE OF NOXIOUS FUMES FROM BATTERIES.

SPECIFICATION forming part of Letters Patent No. 363,880, dated May 31, 1887.

Application filed December 29, 1886. Serial No. 222,924. (No model.)

*To all whom it may concern:*

Be it known that we, MARK BAILEY and JOHN WARNER, subjects of the Queen of Great Britain, residing, respectively, at Nollies Lodge, Clarence Road, Wood Green, London N., and 21 Osborn Street, Whitechapel, London, England, have invented certain new and useful Improvements in an Improved Method of Preventing the Escape of Noxious Fumes from Batteries Used for Electrical Purposes; and we do hereby declare the following to be a full, clear, and exact description of the invention, such as will enable others skilled in the art to which it appertains to make and use the same.

Our invention relates to an improved method of preventing the escape of noxious fumes from batteries used for electrical purposes, and is carried into effect by means of the combinations shown in the accompanying drawings, in which—

Figure 1 shows part sectional elevation of an ordinary cell fitted with bell glass. Fig. 2 shows part sectional elevation of our improved form of cell fitted with cover and porous pot, of special construction; Fig. 3, special saucer, bell glass, and method of making connection; Fig. 4, a portable form of internal pot fitted with special device for preventing escape of fumes; Fig. 5, a section of bottle-shaped internal pot.

We inclose the elements A and B, Fig. 1, in a bell glass or shade, $d$, which dips into the liquid contained in the outer jar, E, in such a manner as to form an effectual seal, and so prevent the escape of any gases evolved. The bell glass or shade rests upon three or more feet, F, which may consist of loose pieces of glass, porcelain, or other suitable substance; or they can be formed in the material or substance of the cell. The connections are in this case led by means of aluminium wires $p\,p$, properly protected with any substance capable of resisting the action of acid and insuring good insulation through the fluid in the outer cell and under the shade. The shade or bell glass is fitted with a stop-cock, G, which can be formed in the knob at the top, or a stopper, as at $h$, Fig. 2, ground in. We find in practice that after a time the gas evolved is again absorbed by the water in the outer cell, causing a vacuum to be formed under the shade and rendering its removal difficult. The stopper $h$ or cock G obviates this.

Fig. 2 shows a part sectional elevation of our improved form of battery-cell and cover. The positive and negative elements A and B are placed in a glass, porcelain, or other external cell or jar, E, having a lip or exterior channel, J, surrounding it near its top. This lip has feet, as at F, formed in its substance; or they may consist of loose pieces, as already described for Fig. 1. The porous pot K, containing the element B, we make of the bottle shape shown, (see also section of same, Fig. 5,) the part of the bottle-shaped pot above the water-line being glazed. Through the mouth of the porous pot or bottle K a rod of carbon, B, is passed, the upper part of this carbon rod being so formed as to fit the neck of the bottle tightly. (See Fig. 5.) Below this point it can be cut away, if desired. The top of this carbon rod has a hole bored in it, as at $l$, Fig. 5, and this hole we prefer to fill with mercury, into which dips an aluminium wire, $p$, which is then led out, as shown. The element A consists of zinc and is connected up to another aluminium wire, $p$, and both wires are then carried through the lip or channel J, which is filled with oil, paraffine, or any other substance capable of insuring good insulation to the connections used and forming an efficient seal. Any kind of depolarizer or excitant may be used with our improved cell, or the elements may be varied; but when even the most powerful acids are employed no smell or noxious fumes can escape. A small stopper, $h$, may be ground into the knob of the dome, shade, or cover $d$; or a simple hole, as that in which the stopper $h$ fits, may be employed, a cork being substituted for the stopper to enable the shade to be readily removed and replaced.

Fig. 3 shows an improved method of preventing the escape of noxious fumes with existing batteries. In this case we provide a saucer, S, of suitable shape and dimensions to hold the cell. This saucer is either fitted with feet F, formed in its substance, or loose pieces of glass, porcelain, or similar material, as already described for Fig. 1, are employed. The saucer is then filled with oil, paraffine, or other good insulating substance, and a shade or cover, d, which may, if desired, be fitted with a stop-cock, G, stopper h, or other equivalent device for effecting our purpose, as already described, is placed over the cell and rests upon the feet F under the surface of the liquid in the saucer S. The connecting-wires are then led out, as already described. By this modification of our invention any form of existing battery may be effectually sealed, the use of a stink-closet avoided, and the corrosive action due to the escape of acid fumes prevented. The efficiency of the cell is also increased by reason of the high insulation afforded by the non-conducting substance placed in the saucer.

Fig. 4 shows a portable form of internal porous pot or bottle containing the negative element, and a gas collector, shade, or cover of special construction for receiving any acid or other noxious fumes evolved. In this application we provide a glass tube, O, of suitable size, within which is blown a smaller tube, $m$, extending nearly to its top and extending outward to a convenient distance. We prefer to fasten the small tube $m$ into the pitch, resin, or other covering matter of the pot; or it may be placed in an india-rubber cork suitably fastened in the same. Placed over the smaller tube $m$, inside the tube O, is an inverted shade or cover, $d$. The tube O is then filled with water, and any gases evolved during the action of the cell are collected in the shade $d$. If desired, the device now described may be made by passing the tube $m$ through a cork, which cork is then fastened into a piece of tube, an inverted tube being placed within the same.

The saucer S, Fig. 3, and the cell E of Figs. 1 and 2, answer the same purpose of supporting the elements and bell-cover $d$ and affording a bottom for the battery. Each of them is therefore a support. The bell-cover $d$ is shown in three different forms in the figures, but is essentially the same device in all.

We have now described our invention, and claim as under—

1. In a primary battery, the combination of the elements and a support therefor provided with internal feet, with a bell-cover resting on the said feet, and the circuit-wires extending under the edge of said bell-cover, substantially as set forth.

2. The combination of the battery elements, the wires, and a support having feet, with a bell-cover resting on said feet and preventing the escape of fumes from the battery, said bell-cover being provided with an outlet and cock, substantially as set forth.

3. The combination of cell E, the elements contained therein, and the wires leading from said elements, with a bell-cover, $d$, having an outlet and cock, substantially as set forth.

In testimony whereof we affix our signatures in presence of two witnesses.

MARK BAILEY.
JOHN WARNER.

Witnesses:
JNO. BOULTON,
WM. CRAWLEY,
Clerks to Messrs. Grain & Sons, Notaries, 46 Lombard St., London, England.